(No Model.)
A. CHAPPÉE.
PORTABLE BAKING OVEN.
No. 336,550. Patented Feb. 23, 1886.
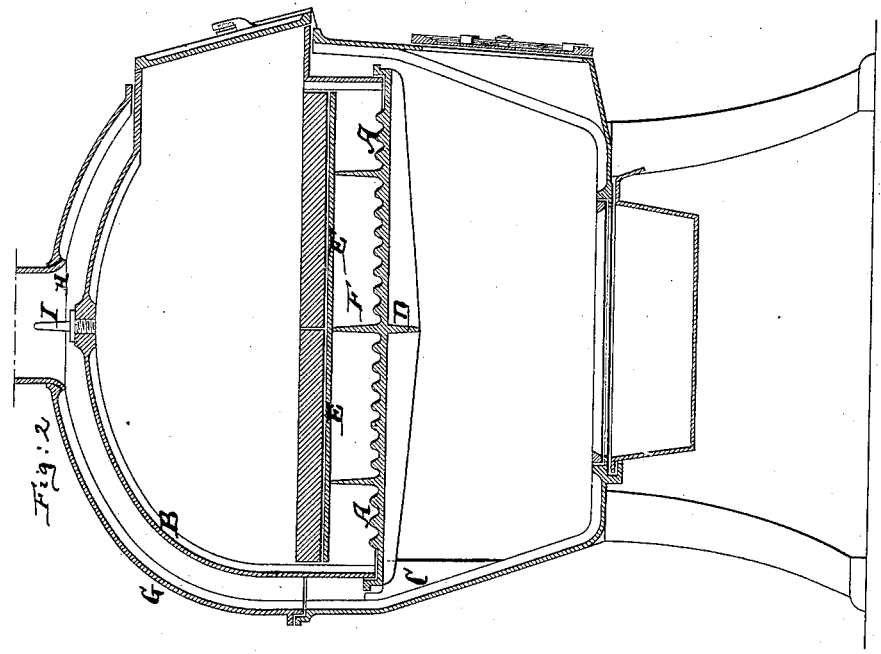
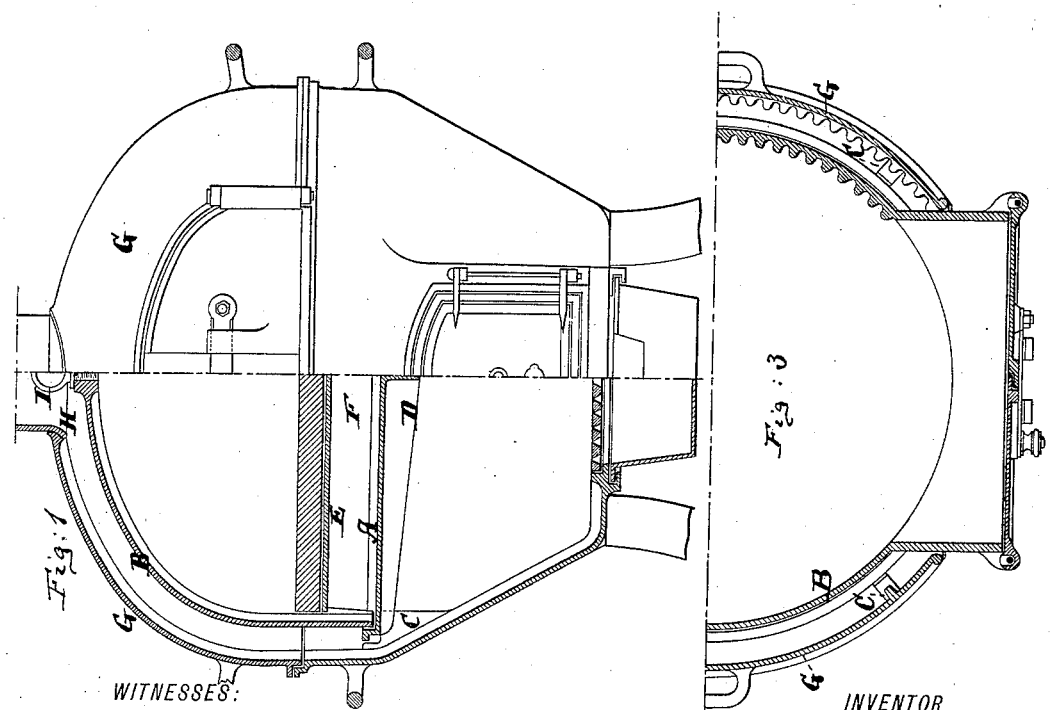
WITNESSES:
John M. Speer.
Gustav Schneppe.
INVENTOR
Armand Chappée
BY Briesen & Steele
his ATTORNEYS.

UNITED STATES PATENT OFFICE.

ARMAND CHAPPÉE, OF LE MANS, FRANCE.

PORTABLE BAKING-OVEN.

SPECIFICATION forming part of Letters Patent No. 336,550, dated February 23, 1886.

Application filed July 29, 1885. Serial No. 172,927. (No model.) Patented in France February 9, 1885, No. 166,908.

*To all whom it may concern:*

Be it known that I, ARMAND CHAPPÉE, of the city of Le Mans, France, have invented an Improved Portable Baking-Oven for Domestic and other Use, of which the following is a full, clear, and exact description, and for which I have obtained a patent in France for fifteen years, dated February 9, 1885, and numbered 166,908.

This invention relates to a portable baking and cooking oven, applicable, also, for other purposes; and it has for its object to provide an improved oven for domestic use for baking bread and other food in an economical manner. By this means the use of baker's bread made with flour usually containing a large admixture of other matters having inferior nutritive qualities may be avoided, and home-made bread may be brought within the reach of any one possessing one of these ovens. These ovens are of inexpensive construction, and may be made of any size, according to particular requirements.

Reference is to be had to the accompanying drawings, and to the letters and figures marked thereon, wherein I have represented an example of a portable oven for domestic use.

Figure 1 is a half-sectional front elevation; Fig. 2, a longitudinal vertical section, and Fig. 3 a sectional half-plan of the oven.

The apparatus consists of a furnace with charging-door, fire-bars, and ash-pan. This furnace is constructed to consume any kind of fuel—such as wood, coal, peat, &c.—and is corrugated or fluted internally to avoid cracks produced by sudden cooling. Within the furnace-chamber is placed the oven, constructed of a corrugated or fluted bottom plate, A, and a dome, B, also corrugated or fluted, and provided with a mouth or opening closed by a door, which latter parts may be corrugated or fluted internally or externally. The corrugation or fluting of these various surfaces serves in all cases, not only only to prevent breakage by sudden cooling, but also to increase the heating-surface, and, consequently, the temperature of the oven by increasing its internal surface. The dome B rests on the bottom A, which is itself supported above the fire by brackets C, projecting inward from ribs or corrugations on the sides of the fire-place. The bottom A is strengthened by cross-ribs D at the under side, and supports, by means of ribs on the upper surface, an upper or false bottom, E, upon which are laid the bricks forming the hearth of the oven. A space or hot-air chamber, F, is thus left between the bottom A and the false bottom E, the edges of which only meet the apexes of the internal ribs or corrugations of the dome, thus leaving channels all round the hearth, by which the hot air contained in the hot-air chamber F, comprised between the plates A and E, can escape and rise into the interior or baking space of the oven.

In order to prevent the entry of smoke into the interior of the oven, the lower edge of the dome B fits within a rising flange or rim around the bottom A, so as to make a joint.

The dome B is furnished with a handle or ring, I, for lifting it in and out of its place in the oven.

The dome B is inclosed by an outer dome, G, also fluted or corrugated internally, and fits on and makes a tight joint with the lower part of the furnace-chamber. This outer dome has for its object to cause the flames and gases from the furnace to play against the inner dome, B, of the oven proper, and thus to utilize to the utmost the heat of the fire. The dome G is connected to a chimney for carrying off the products of combustion, which chimney may have a damper for regulating the draft. At the base of this chimney there is a downwardly-projecting circular rib or flange, H, which, by narrowing the space between the inner and outer domes, retards the exit of the gases and brings them into close contact with the oven.

The whole oven is mounted upon cast-iron legs or feet, so as to bring the mouth of the oven to a convenient height.

I do not claim an oven having an immovable dome, such as is shown in Patent No. 39,042, or in French Patent No. 12,509, of 1844.

I claim—

In an oven, the combination of the plate

A, having peripheral flange and upright ribs, with the upper plate, E, resting on said ribs, removable inner dome, B, which is supported by the plate A, and surrounded by the flange of the same, outer dome, G, chimney, and lower furnace, all arranged substantially as herein shown and described.

The foregoing specification of my improved portable baking-oven for domestic and other use signed by me this 9th day of July, 1885.

ARMAND CHAPPÉE.

Witnesses:
ROBT. M. HOOPER,
ALBERT MOREAU.